US012694228B2

(12) United States Patent
Moturi et al.

(10) Patent No.: US 12,694,228 B2
(45) Date of Patent: Jul. 28, 2026

(54) REAL-TIME USER COMMUNICATION SENTIMENT DETECTION FOR DYNAMIC ANOMALY DETECTION AND MITIGATION

(71) Applicant: T-Mobile USA, Inc., Bellevue, WA (US)

(72) Inventors: Varaprasad R. Moturi, Frisco, TX (US); Wendy I. Neal, Haltom City, TX (US); Godofredo Orama, McKinney, TX (US); Manjushree Patterson, Overland Park, KS (US); Matthew Carag Santiago, Forney, TX (US); Rathinayagam Velusamy, Celina, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 334 days.

(21) Appl. No.: 18/189,833

(22) Filed: Mar. 24, 2023

(65) Prior Publication Data
US 2024/0320443 A1     Sep. 26, 2024

(51) Int. Cl.
G06F 40/40 (2020.01)
G06F 40/284 (2020.01)
H04W 4/16 (2009.01)

(52) U.S. Cl.
CPC ............ G06F 40/40 (2020.01); G06F 40/284 (2020.01); H04W 4/16 (2013.01)

(58) Field of Classification Search
None
See application file for complete search history.

(56) References Cited

U.S. PATENT DOCUMENTS

| | | | |
|---|---|---|---|
| 8,719,277 B2 | 5/2014 | Davies | |
| 10,380,490 B1 * | 8/2019 | Somasundaran | ..... G06F 40/253 |
| 10,635,987 B1 | 4/2020 | Chen et al. | |
| 10,990,760 B1 * | 4/2021 | Monnett | .............. G06F 40/295 |
| 11,268,732 B2 | 3/2022 | Boettcher et al. | |
| 11,451,408 B2 | 9/2022 | Park et al. | |

(Continued)

FOREIGN PATENT DOCUMENTS

| | | |
|---|---|---|
| CN | 109168052 A | 1/2019 |
| CN | 109192276 A | 1/2019 |
| CN | 109446378 A | 3/2019 |
| CN | 111615708 A | 9/2020 |

(Continued)

*Primary Examiner* — Daniel C Washburn
*Assistant Examiner* — Tyler Becker
(74) *Attorney, Agent, or Firm* — Perkins Coie LLP

(57) ABSTRACT

System and methods for real-time user communication sentiment detection for dynamic anomaly detection and mitigation are disclosed herein. An indication of an interaction between a user of a wireless telecommunication network and an operator of the wireless telecommunication network can be obtained. A timeseries indicating a sentiment associated with the user during the interaction at different points in time can be determined. A criterion indicating a negative sentiment associated with the timeseries can be obtained. Whether the timeseries includes an anomaly can be determined by determining whether at least a portion of the timeseries satisfies the criterion. Upon determining that the timeseries includes the anomaly, a notification indicating that the wireless telecommunication operator needs assistance can be created.

20 Claims, 7 Drawing Sheets

(56) References Cited

U.S. PATENT DOCUMENTS

| | | | | |
|---|---|---|---|---|
| 11,632,456 B1 * | 4/2023 | Mevorah | ............ | H04M 1/72454 |
| | | | | 455/420 |
| 11,778,098 B1 * | 10/2023 | Kwak | ................. | H04M 3/5232 |
| | | | | 379/266.01 |
| 11,971,908 B2 * | 4/2024 | Neves | ................... | G06F 16/285 |
| 2014/0140497 A1 * | 5/2014 | Ripa | ................... | H04M 3/5175 |
| | | | | 379/265.06 |
| 2015/0281454 A1 * | 10/2015 | Milstein | ............ | H04M 3/42221 |
| | | | | 379/265.12 |
| 2019/0050875 A1 * | 2/2019 | McCord | ................ | G06F 40/242 |
| 2019/0220777 A1 * | 7/2019 | Johnson | .............. | H04M 3/5175 |
| 2019/0387098 A1 * | 12/2019 | McEnroe | ............ | H04M 3/5175 |
| 2022/0070623 A1 * | 3/2022 | Nelson | .................... | H04W 4/02 |
| 2022/0180179 A1 | 6/2022 | Gusat et al. | | |
| 2022/0342745 A1 | 10/2022 | Gonzalez Macias et al. | | |
| 2022/0342860 A1 | 10/2022 | Gonzalez Macias et al. | | |
| 2022/0342861 A1 | 10/2022 | Gonzalez Macias et al. | | |
| 2022/0342868 A1 | 10/2022 | Gonzalez Macias et al. | | |
| 2024/0005915 A1 * | 1/2024 | Pozzan | ................... | G10L 25/63 |

FOREIGN PATENT DOCUMENTS

| | | | |
|---|---|---|---|
| CN | 111954889 | A | 11/2020 |
| CN | 113128217 | A | 7/2021 |
| CN | 113642867 | A | 11/2021 |
| CN | 113657547 | A | 11/2021 |
| CN | 113761446 | A | 12/2021 |
| DE | 202013005878 | U1 | 9/2013 |
| EP | 3189449 | A2 | 7/2017 |
| EP | 3131014 | B1 | 12/2021 |
| JP | 2015509222 | A | 3/2015 |
| JP | 6739673 | B1 | 7/2020 |
| JP | 2020522776 | A | 7/2020 |
| JP | 2020525872 | A | 8/2020 |
| JP | 2021052812 | A | 4/2021 |
| JP | 7108122 | B2 | 7/2022 |
| KR | 102138967 | B1 | 7/2020 |
| KR | 102222637 | B1 | 3/2021 |
| KR | 102313037 | B1 | 10/2021 |
| KR | 20210120852 | A | 10/2021 |
| WO | 2017127373 | A1 | 7/2017 |
| WO | 2019067630 | A1 | 4/2019 |
| WO | 2019067631 | A1 | 4/2019 |

* cited by examiner

700

REAL-TIME USER COMMUNICATION SENTIMENT DETECTION FOR DYNAMIC ANOMALY DETECTION AND MITIGATION

BACKGROUND

Artificial intelligence (AI) is intelligence—perceiving, synthesizing, and inferring information—demonstrated by machines, as opposed to intelligence displayed by non-human animals and humans. Example tasks in which this is done include speech recognition, computer vision, and translation between (natural) languages, as well as other mappings of inputs.

AI applications include advanced web search engines (e.g., Google Search), recommendation systems (as used by YouTube, Amazon and Netflix), human speech recognition programs (such as Siri and Alexa), self-driving cars (e.g., Waymo), and strategic game systems that employ automated decision-making and compete at the highest level in (such as chess and Go). As machines become increasingly capable, tasks considered to require "intelligence" are often removed from the definition of AI, a phenomenon known as the AI effect. For instance, optical character recognition is frequently excluded from things considered to be AI, having become a routine technology.

Natural language processing (NLP) allows machines to read and understand human language. A sufficiently powerful NLP system would enable natural language user interfaces and the acquisition of knowledge directly from human-written sources, such as newswire texts. Some straightforward applications of NLP include information retrieval, question answering, and machine translation.

BRIEF DESCRIPTION OF THE DRAWINGS

Detailed descriptions of implementations of the present invention will be described and explained through the use of the accompanying drawings.

Figure 1:
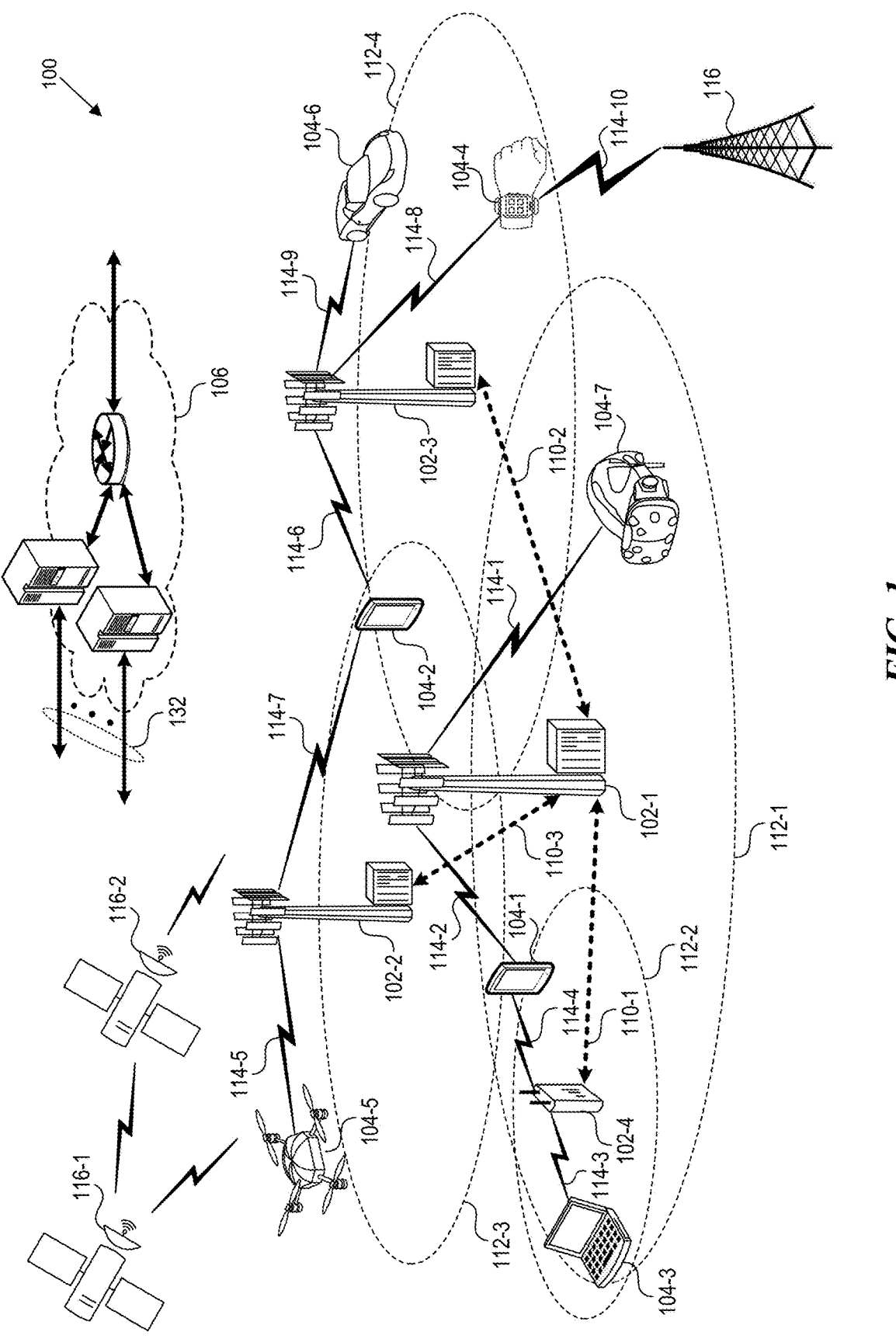
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Methods and systems disclosed herein relate to characterizing communications of users with telecommunication-based operators, such as call centers, in order to dynamically issue notifications that enable mitigation of issues such as negative user sentiment during the communication. In some implementations, the disclosed system can generate reports for both dynamic and post-communication feedback for operators in order to make improvements to operator efficiency and effectiveness in communication.

Data regarding user sentiment during a communication with an operator, such as during a technical support call, are conventionally only available after the end of the communication. For example, a user can submit feedback following the communication, which requires time-consuming processing and summarization. As a result, in many cases, any issues that arise during a communication only become apparent following the call, such as through feedback or adverse action on the user's part. As a result, conventional sentiment analysis systems for communications can result in undesirable outcomes as, due to the delay in receiving user feedback, such systems fail to act before negative outcomes are inevitable. Furthermore, tools for receiving such feedback may be limited or inaccurate. For example, users can ignore requests for feedback, or may lie in corresponding responses. As such, conventional user sentiment analysis systems may struggle to generate accurate metrics for analysis or predictions. Additionally, conventional systems for sentiment analysis of communications struggle to provide context to sentiment analysis results. For example, conventional systems do not correlate user sentiment with user actions, such as attrition or churn within a given system. For example, a conventional system lacks information regarding whether an interaction characterized by poor sentiment relates to long-term churn or subsequent disengagement.

The methods and systems disclosed herein enable dynamic user sentiment analysis during and immediately following communications to mitigate, interrupt, or track events affecting user sentiment in real time. By doing so, the system enables problem solving and intervention during communications to improve outcomes relating to the user. For example, in some implementations, where user sentiment is detected to be falling, the system can, in real time, generate a request for assistance from other operators, such that the fall in user sentiment can be reduced or reversed. Moreover, the system can generate reports of the communication in real time, including keywords, and forward these to relevant operators or controllers, such as managers, to provide information pertinent to solving any sentiment-related issues for the user. For example, an administrator to an operator of a call with declining sentiment can train the operator in real time based on a generated report of the sentiment of the call, which can include any words or phrases used by the user or the operator that are relevant to the user's sentiment.

Furthermore, by generating sentiment scores dynamically and without direct user feedback, the systems disclosed herein offer improved accuracy for generated sentiment scores, as scores are directly related to the interaction and are not dependent on the user truthfully or consistently answering surveys or providing feedback. As such, the current system provides robust tools to provide insights and prediction into the quality of communications and the resulting sentiment of associated users. In addition, the system can provide results in the context of longer-term or larger-scale data. For example, the presently disclosed system can generate sentiment metrics that can be combined with other data, such as user disengagement data (e.g., churn) or user engagement data (e.g., interest in further services), to correlate user or operator actions and communications with such outcomes. By doing so, the system can improve the quality of analytics as related to sentiment and, as such, improve the efficiency and effectiveness of telecommunications-related support calls or communications.

In disclosed implementations, for example, the system generates a timeseries of user sentiment over time and determines, in real time, whether any anomalies arise within this timeseries. The system can obtain a representation of a communication between a network operator (e.g., a technical support specialist) and a user. For example, the system generates a transcript of a telephone call. The system can utilize NLP or other artificial intelligence methods in order to determine a timeseries of the user's sentiment over the course of the telephone call. For example, the system can determine whether a dip in user sentiment is uncharacteristic of the communication and, as such, determine whether any interventions could benefit the communication. The system can compare a deviation in the timeseries of user sentiment during a telephone conversation with criteria that are characteristic of an issue. Based on this comparison, the system can notify any relevant stakeholders, such as other operators of the telecommunications network, and enable these operators to assist the user. By doing so, the disclosed system provides an opportunity for improvements to a user's sentiment before the communication terminates. In some implementations, the system generates reports for the benefit of stakeholders or managers, in order to improve the effectiveness of communications with users. For example, the system synthesizes reports indicating relative performance of operators or the effect of communications or telephone calls on user engagement. The system can personalize the report depending on its intended recipient to improve the utility of information derived from the communications.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer to improve link efficiency. In the control plane, the Radio Resource Control (RRC) protocol layer provides establishment, configuration, and maintenance of an RRC connection between a wireless device 104 and the base stations 102 or core network 106, supporting radio bearers for the user plane data. At the physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL)

transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
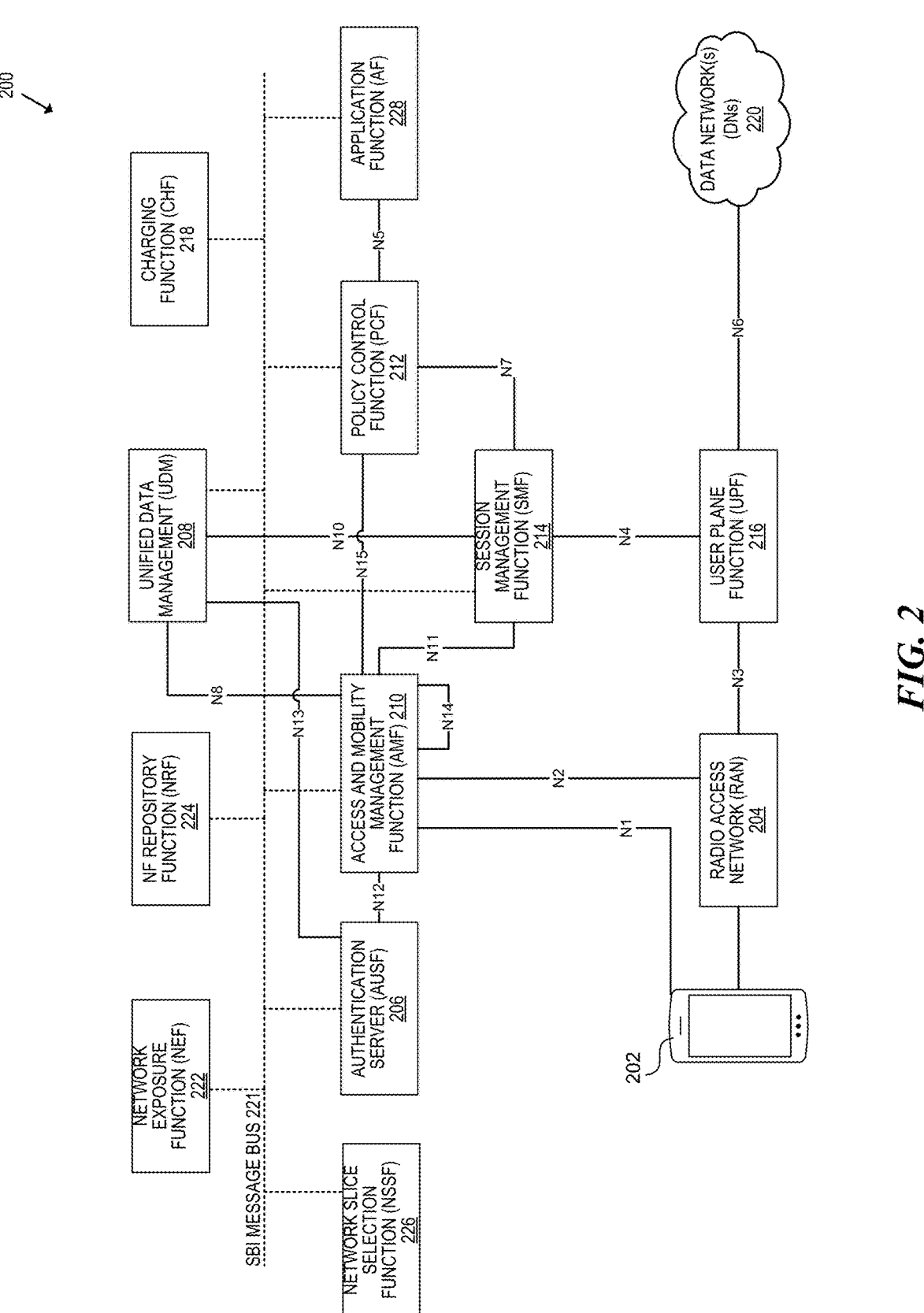
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions.

The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes network slice selection, which can be regulated by an NSSF 226.

Sentiment Analysis System

Figures 3A, 3B:
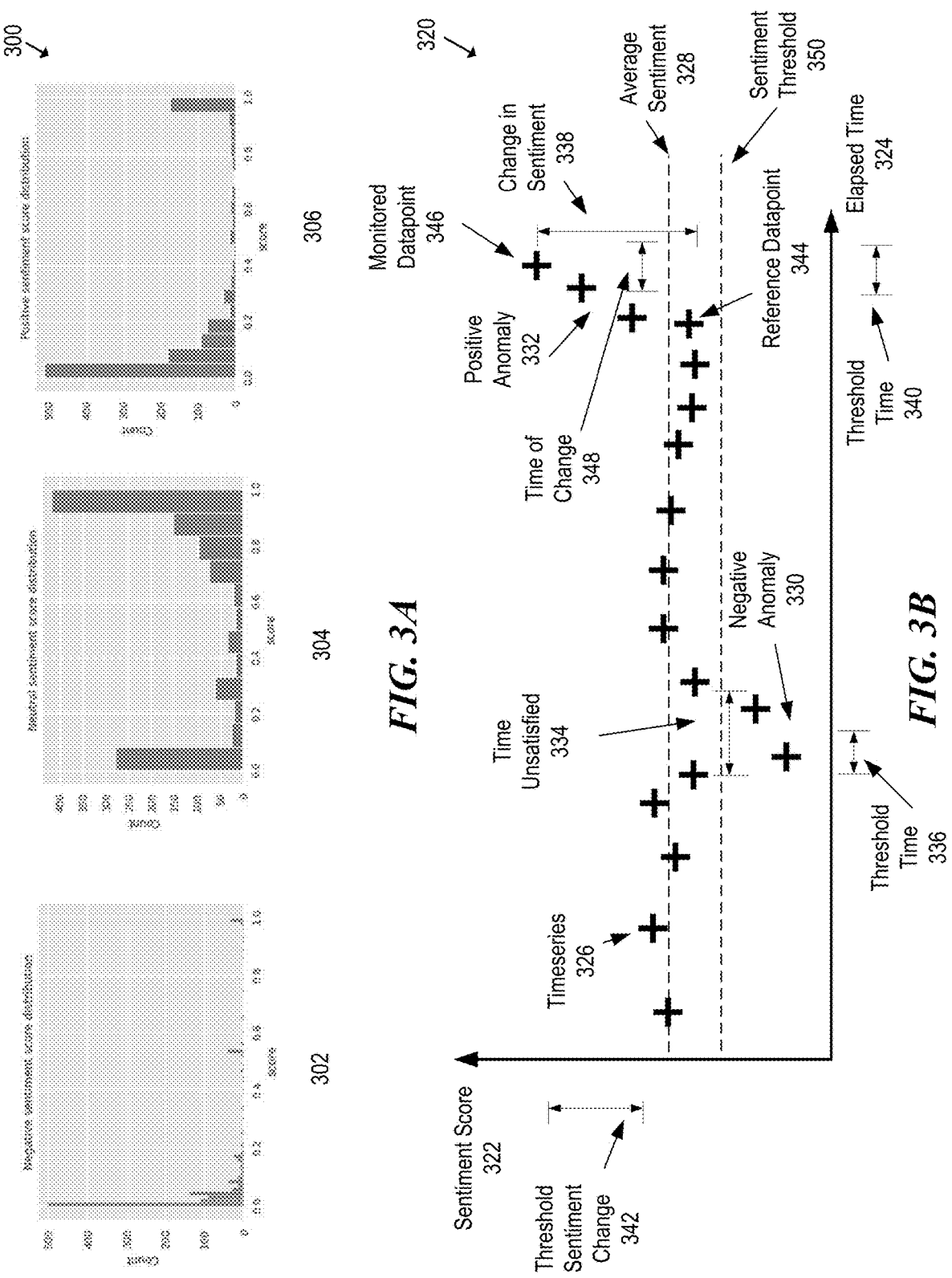
FIG. 3A is a schematic demonstrating sentiment score distributions for negative, neutral, or positive user satisfaction metric ranges.
FIG. 3B is a schematic demonstrating a timeseries of sentiment data for an interaction over time.

FIG. 3A is a schematic demonstrating sentiment score distributions for negative, neutral, or positive user satisfaction metric ranges. For example, plots 300 depict distributions of sentiment scores as functions of user-indicated sentiment. Plot 302 depicts a sentiment score distribution for users that indicated negative sentiment following an interaction with an operator of a wireless telecommunication network. Plot 304 depicts a sentiment score distribution for users that indicated neutral sentiment following an interaction, while plot 306 depicts a similar distribution for users indicating a positive sentiment score distribution. In each of plots 302-306, the horizontal axis indicates a system-generated sentiment (e.g., a sentiment score) associated with interactions. The corresponding vertical axis indicates the distribution of interactions of a given user-indicated sentiment category (e.g., negative, neutral or positive) associated with a corresponding system-generated sentiment score. For example, as shown in plot 302, negative user-indicated sentiment correlates with lower sentiment scores, indicated by a large number of scores clustered at a lower sentiment score. In contrast, as shown in plot 304, a neutral user-indicated sentiment is associated with scores clustered with intermediate sentiment scores, including both low scores near 0.0 (e.g., the lower end of a numerical range) and high scores near 1.0 (e.g., the higher end of a numerical range). Thus, the system can generate sentiment scores that correlate with user-indicated sentiment throughout an interaction.

In disclosed embodiments, an operator of a wireless telecommunication network can include an entity involved in maintaining or assisting with the wireless telecommunication network, such as an administrator, engineer, or technical assistant. For example, an operator can include a technical support specialist or similar role that aids users of the wireless telecommunication network. Additionally or alternatively, an operator of a wireless telecommunication network can include an entity associated with promoting or distributing services associated with the wireless telecommunication network, such as a sales or marketing agent. In some implementations, an operator can be a virtual assistant, such as an artificial intelligence-based agent or a chatbot. Operators can provide assistance to users, encourage users to take certain actions, or discourage users from taking certain actions. As such, operators can benefit from training and feedback based on interactions with users and the associated user sentiments. For example, by tracking user sentiment as through the course of an interaction, the system can evaluate the effectiveness of an operator's words or demeanor on the user's sentiment and, thus, provide feedback or reports to the operator accordingly.

An operator may be associated with an identifier (e.g., an identifier of the operator). For example, an identifier includes a phone number, an identification number, and/or a name (first and/or surname). In some embodiments, an identifier of the operator can include an identifier of an artificial intelligence model, a chatbot, or an identifier of a server or instance of a model. By associating an operator with an identifier, the system can determine attributes or information related to a given operator, such as an operator's controller (e.g., manager or another stakeholder), an operator's call history, ranking, or other information. For example, the system searches for an operator using the associated operator identifier in a database of operators and determines a controller associated with the operator. By doing so, the system can transmit information relating to the operator, such as feedback based on user sentiment during an interaction of the operator with a user, to a relevant controller of the operator.

An operator can include assisting operators. In disclosed embodiments, an assisting operator can include any operator capable of assisting, taking over from, or otherwise supporting other operators. For example, an assisting operator can include an operator, or a manager of an operator. An assisting operator can provide feedback or tips to another operator or can control the interaction. For example, upon detecting an anomaly in sentiment of an interaction associated with a given operator, the system queries other operators that are capable of assisting the operator and determines their availability; based on this availability, the system can transfer control of the interaction to any available assisting operators or, for example, enable communication of the assisting operators with the user associated with the interaction. By doing so, the system enables dynamic mitigation of user sentiment issues. For example, if the system determines that it is likely that an interaction includes an anomaly, the system enables assisting operators to assist an original operator associated with the interaction to mitigate or reduce the anomaly.

Operators, including assisting operators, may be associated with one or more controllers. In disclosed embodiments, a controller can include a supervisor, stakeholder, manager, or managing platform or algorithm associated with the operator or interaction. For example, a controller includes an entity responsible for training operators. In some embodiments, a controller includes an algorithm or program associated with training an artificial intelligence, machine learning model, or chatbot operator. In disclosed embodiments, the system generates a report for the interaction and transmits the report to a controller associated with the operator. Based on the report, the controller can train the operator to improve outcomes associated with the interaction. By doing so, the system improves the effectiveness of operators and improves user experience associated with communications and interactions with operators.

The system enables determining the sentiment throughout an interaction of a user with an operator of a wireless telecommunication network. In some embodiments, an interaction includes one or more communications between users and/or operators. For example, an interaction can include a textual communication, including messages (digital and/or physical), emails, or transcripts of verbal or nonverbal communications. For example, interactions include telephonic or video-based communications or conversations, voice messages, and/or transcripts thereof. In some embodiments, an interaction can include a recorded call between an operator at a call center associated with the wireless telecommunications network and a user of the wireless telecommunications network, in an audio file format. The system can obtain textual representations of such interactions, including timestamps associated with the interactions, and generate timeseries of user sentiment throughout the interactions. By doing so, the system can monitor the interaction for any anomalies, including decreased user sentiment, and take evasive action accordingly.

The system can receive an indication of an interaction. As disclosed herein, an indication of an interaction can include information related to an interaction. For example, an indication of an interaction includes an audio file or recording of a phone call between two entities. In some embodiments, an indication of an interaction can include a transcript (e.g., any textual representation) of an audio file or interaction, such as a phone call, video call or another interaction. An indication of an interaction can include a text relating to an interaction, such as a chat, email, or text message. In some embodiments, an indication of an interaction includes a pointer or reference to a location that comprises a representation of an interaction. By receiving indications of interactions and processing these indications to determine how user sentiment varies over time, the system can evaluate the interaction for any anomalies or changes in sentiment, in order to improve user experience by dynamically evaluating, recording and/or interfering with any such anomalies.

An indication of an interaction includes textual representations of interactions. In disclosed embodiments, textual representations can include any representations of interactions represented as text, such as alphanumeric characters. For example, a textual representation of an interaction includes a transcript of an audio or video-based communication. In some embodiments, textual representations include text within text messages, emails, chats, or other text-based communications. For example, textual representations include alphanumeric characters such as numbers, symbols, or punctuation that is part of communications or interactions. Textual representations can be stored digitally as textual data, such as within text strings, arrays of characters or document files. By receiving and processing textual representations of interactions, the system can tokenize such text (e.g., by generating tokens associated with characters, words, phrases, sentences and/or paragraphs) and/or utilize NLP methods, such as artificial intelligence, in order to evaluate or monitor interactions. For example, the system can utilize portions (which may or may not correspond to natural language tokens) of textual representations of interactions to generate timeseries that track user sentiment during an interaction over time. Thus, utilizing textual representations of communications or interactions enables the system to analyze interactions more effectively for user sentiment.

FIG. 3B is a schematic demonstrating a timeseries of sentiment data for an interaction over time. For example, plot 320 describes how sentiment score 322 for a given interaction varies over elapsed time 324. Variations of sentiment score 322 are depicted through timeseries 326. Timeseries 326 can be characterized by average sentiment 328 and may exhibit one or more negative anomalies 330 and/or one or more positive anomalies 332. By tracking timeseries information regarding sentiment relating to an interaction over time, the system enables preventative action against negative anomalies associated with user sentiment, as well as evaluation and analytics of the effectiveness of the operator and/or the responsiveness of the user to the interaction.

The system can evaluate sentiment associated with a user through the course of an interaction. In disclosed embodiments, a sentiment includes information regarding affective states and/or subjective information. For example, sentiments include classifications of the polarity of a given interaction, communication, or text, or portions thereof. Polarity can include information regarding whether an opinion associated with a communication is positive, negative, or neutral. In some embodiments, sentiment includes additional or alternative classifications, including descriptions of emotional states such as enjoyment, anger, disgust, sadness, fear, and surprise. In some instances, sentiment includes classification of communications and an indication of a degree of the classification. As an illustrative example, the system determines that a sentence uttered by a user within a video conversation is associated with "intense anger," as opposed to "mild anger." The system can determine sentiment using artificial intelligence, machine learning, and/or NLP. By determining the sentiment of portions of interactions, the system can track user engagement and user sentiment throughout an interaction. Thus, if an interaction appears unsatisfactory or frustrating, the system enables notification of relevant entities (e.g., assisting operators or controllers) for intervention, further evaluation, or training.

In disclosed embodiments, sentiment can include quantitative measures of user emotional states or subjective information. For example, sentiment includes sentiment score 322, which can include a quantitative measure of sentiment. In some embodiments, sentiment score 322 includes a numerical value within a numerical range (e.g., a range of zero to 10) indicating intensity or polarity of a sentiment associated with a user. For instance, sentiment score 322 is associated with an intensity of a particular emotional state (e.g., anger). Additionally or alternatively, sentiment score 322 characterizes a sentiment's emotional state or subjective state itself. For example, a sentiment score indicates whether a sentiment is more closely associated with anger or satisfaction on a scale with pure anger or pure satisfaction at either extreme. Sentiment and/or sentiment scores can be associated with particular entities associated with one or more interactions. For example, the system can determine a first sentiment score for a user and a second sentiment score for an operator. In some implementations, calculation of sentiment can be supplemented, calibrated, or determined based on customer satisfaction scores received from surveys. For example, a user can submit a survey during or following an interaction using a telephonic communication system (e.g., a telephone survey), a text message (e.g., a short message service (SMS) survey), and/or through other electronic messages (e.g., e-mail surveys). The system can utilize results (e.g., customer satisfaction scores) from one or more surveys to update, normalize, or supplement the sentiment that is determined during interactions. Additionally or alternatively, sentiment can be determined through keywords. As an illustrative example, a keyword-based customer satisfaction prediction model can be used to determine sentiment, as described below. By characterizing the sentiment using a quantitative measure, such as a sentiment score, the system can evaluate sentiment in a manner that enables comparison over time or across users or interactions. By doing so, the system enables more effective evaluation of anomalies within interaction, as well as standardization of evaluations of interactions across multiple operators and/or users.

Sentiment determined by the system can indicate negative sentiment. For example, negative sentiment includes sentiment that is associated with negative emotions, ideas, or situations. For example, negative sentiment can indicate frustration, anxiety, anger, disgust, or any unfavorable emotions, feelings, or sensations. For example, an "unsatisfied" sentiment can be expressed by a negative sentiment score. In disclosed embodiments, negative sentiment is associated with a range of quantitative measures of sentiments (e.g., a numerical range or threshold of sentiment scores). Negative sentiment can be associated with an intensity and/or indicate a proportion of detected sentiments that are considered to be negative. The system can use a keyword-based customer satisfaction prediction model in order to calculate a measure of negative sentiment. For example, negative sentiment is determined based on a proportion of words within a transcript of an interaction associated with negative keywords from a keyword database. In some implementations, the keyword-based customer satisfaction prediction model includes natural language processing models, machine learning models, or other algorithms that enable prediction of customer satisfaction based on keywords within interactions and/or surveys. Negative sentiment can be calculated based on attributes of an interaction, such as voice inflections or intensity of a user's voice within an audio file of a telephone conversation. For example, some inflections or pitch changes indicate that a user is exhibiting negative sentiment. In some implementations, the system can consider information regarding these attributes of an interaction in tandem with keywords from a keyword database to improve the accuracy of a determined sentiment for a portion of an interaction. As an illustrative example, the expression "Oh my god" can be stored in the keyword database. The system can determine the sentiment of a portion of an interaction based on the presence of the expression within a voice recording of the user, as well as based on the inflection detected within the voice recording. Additionally or alternatively, determining whether sentiment is associated with a negative sentiment can include comparing sentiment (e.g., a sentiment score) to one or more thresholds. By classifying sentiment as "negative," the system can monitor interactions for potential undesirable or unsatisfactory outcomes. For example, the system can determine that an interaction is becoming increasingly characterized by negative sentiment and, in response, involve other operators or controllers to aid the user or operator of the interaction. By doing so, the system dynamically improves the quality of interactions by enabling mitigation of negative outcomes or sentiment before the end of the interaction.

Sentiment determined by the system can indicate positive sentiment. For example, positive sentiment includes sentiment associated with positive emotions, ideas or situations. For example, positive sentiment can include happiness, satisfaction, calmness, excitement, gratitude, pride, awe, or love. For instance, a "satisfied" sentiment can be expressed by a positive sentiment score. In disclosed embodiments, positive sentiment is associated with a range of quantitative measures of sentiment (e.g., a numerical range or threshold of sentiment scores). Positive sentiment can be associated with an intensity and/or indicate a proportion of detected sentiments that are considered to be positive. The system can use a keyword-based customer satisfaction prediction model in order to calculate an measure of positive sentiment. For example, positive sentiment is determined based on a proportion of words within a transcript of an interaction associated with positive keywords from a keyword database. As with negative sentiment, the system can calculate positive sentiment based on attributes of an interaction, such as voice inflections or intensity of a user's voice within an audio recording of a telephone conversation. Additionally or alternatively, determining whether sentiment is associated with a positive sentiment can include comparing sentiment (e.g., a sentiment score) to one or more thresholds. By classifying sentiment as "positive," the system can monitor interactions for potential satisfactory outcomes and/or determine whether a user is likely to engage in further services or actions. For example, by determining that sentiment associated with an interaction is positive, the system can determine whether a given user is more likely to engage with the wireless telecommunication network and, accordingly, can generate suggestions for services, features, or implementations associated with the wireless telecommunication network. In an illustrative example, a first operator associated with technical support is communicating with a user through a phone call to solve a user's technical problem with the network. The system can indicate to the first operator that the user is characterized by a positive sentiment, such as if the first operator is able to solve the user's problem.

Additionally or alternatively, in response, the system can query and include a second operator in the phone call in order to encourage the user to engage in other services, as the user's good mood may be indicative of a higher likelihood of engaging in such services. By doing so, the system can dynamically improve the quality of interactions by enabling operators to engage with users that are more open to such engagement.

In some embodiments, the system can calculate an average sentiment. For example, an average sentiment can include a value expressing a typical or central value of a sentiment score or another measure of sentiment. For example, average sentiment can include a mode, median, or mean of sentiment scores across various sentiment values. For example, an average sentiment indicates a mean sentiment over various portions of a given interaction over time (e.g., the mean sentiment of an interaction, as shown through average sentiment 328 in FIG. 3B). Alternatively or additionally, an average sentiment indicates an average of a sentiment-related value across various interactions; for example, an average sentiment can indicate an arithmetic mean, median, or mode of mean sentiments associated with multiple interactions. For example, the system generates reports that include an indication of an average sentiment. An indication of an average sentiment can include an average sentiment value, or an alternative transformation or presentation of processed average sentiment data (e.g., a representation of a distribution or histogram of sentiments across multiple users, interactions, and/or times). By measuring average sentiment metrics, the system enables analytics based on measured deviations or anomalies from averages. In some embodiments, averages can indicate a state of the network (e.g., an average sentiment across all interactions within a network). Thus, average sentiments confer the presently disclosed system with further analytics that can aid in evaluating and monitoring user sentiment within interactions.

The system can determine sentiment using machine learning models, natural language models, or artificial intelligence (e.g., artificial intelligence models). A "model," as used herein, can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, the artificial intelligence can be a neural network with multiple input nodes that receive indications of interactions, such as textual representations of telephonic communications. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer, ("the output layer") one or more nodes can produce a value classifying the input that, once the model is trained, can be used to characterize sentiment associated with interactions. In some implementations, such neural networks, known as deep neural networks, can have multiple layers of intermediate nodes with different configurations, can be a combination of models that receive different parts of the input and/or input from other parts of the deep neural network, or are convolutions partially using output from previous iterations of applying the model as further input to produce results for the current input.

A machine learning model can be trained with supervised learning, where the training data includes textual information or data as input and a desired output, such as a sentiment score. A representation of textual data, such as natural language tokens, can be provided to the model. Output from the model can be compared to the desired output for that textual information and, based on the comparison, the model can be modified, such as by changing weights between nodes of the neural network or parameters of the functions used at each node in the neural network (e.g., applying a loss function). After applying each of the representations of interactions in the training data and modifying the model in this manner, the model can be trained to evaluate new interactions for sentiment analysis. For example, the system can generate sentiment from text using language models, such as bidirectional encoder representations from transformers (BERT). In some embodiments, the system utilizes vector models for words, sentences, or other text, such as bag-of-words models or word2vec. For example, by utilizing BERT, the system can leverage contextual representations of text to generate sentiment, rather than generating sentiment based on individual keywords. However, in some embodiments, the system can generate sentiment based on individual keywords additionally or alternatively, such as to improve the computational performance of the system.

Based on determining sentiments associated with interactions, the system can generate timeseries of interactions. For example, timeseries 326 includes a series of data points, such as data points representing sentiment, that are plotted or indexed in order of time. For example, the system can determine sentiment for portions of textual representations of interactions, where each portion corresponds to a different time period within the interaction (e.g., within a continuous time period). As an illustrative example, the system separates a textual representation of the interaction into multiple portions all corresponding to time periods within a continuous time period, The system can determine, using artificial intelligence, sentiment associated with each portion of the textual representation, and generate the timeseries accordingly. By doing so, the system generates temporal information relating to sentiment through the course of an interaction, enabling evaluation of user sentiment dynamically over the course of an interaction. Thus, the system enables action to be taken when desirable, such as when the sentiment includes hurt feelings. In some embodiments, the timeseries can pertain to non-continuous time periods, such as if an interaction is of a discrete nature (e.g., for chats or messages), or if the interaction is interrupted (e.g., if there is a break in a call due to cellular reception issues). However, the timeseries can represent sentiment over time even for such non-continuous interactions.

By tracking a timeseries over time, the system determines anomalies where they occur. For example, an anomaly can include an indication that is not expected, predicted, or deemed normal, such as a deviation in a quantity from an expected value. For example, an anomaly can include a sudden change in sentiment in an interaction from a baseline value, an average value, or another expected value. In some embodiments, an anomaly can include a change in emotional state, such as from satisfaction to anger, or from happiness to frustration. For example, an anomaly can have an indication (e.g., an indication of an anomaly) that indicates or describes the nature of an anomaly. As an example, an indication of an anomaly can describe the anomaly's intensity (e.g., amount of deviation from an average or expected value), the anomaly's direction or polarity (e.g., negative vs. positive), or the anomaly's duration. As an illustrative example, positive anomaly 332 can be associated with positive sentiment (e.g., a positive deviation in a sentiment score from a baseline, such as average sentiment 328). Alternatively or additionally, an interaction can exhibit a negative anomaly, such as negative anomaly 330, associated with a negative sentiment (e.g., a negative deviation in a sentiment score from a baseline, such as average sentiment 328). By determining and characterizing anomalies, the system enables response to any detected unexpected sentiment through the course of an interaction, thereby enabling any beneficial interventions or feedback to be generated in real time.

In order to determine the presence of an anomaly, the system can evaluate timeseries with respect to one or more criteria. As referred to herein, criteria can include rules, frameworks, characteristics, or features that are determined to characterize anomalies. For example, criteria can be expressed as threshold values of time, sentiment, or any other quantity. As an illustrative example, the system can include a first threshold that indicates an amount of time and a second threshold that indicates a number within the numerical range. Additionally or alternatively, criteria can include one or more keywords that indicate a user's sentiment. In some implementations, the system can determine the presence of an anomaly based on a change in attributes of the interaction, such as voice inflection or voice intensity. For example, the system can detect the presence of a keyword that exhibits anomalous voice inflection (e.g., a sharp rise in the intensity of the user's voice within a telephone voice recording) and determine the presence of an anomaly accordingly. In some cases, criteria can include a threshold indicating a change in sentiment, and/or an amount of time. Criteria can include one or more combinations of requirements or frameworks with which to analyze interactions in order to determine the presence of anomalies. The system can evaluate an interaction's timeseries with respect to these thresholds or other criteria in order to determine the presence and/or nature of anomalies associated with interactions.

For example, the system can obtain criteria that include threshold time 336 and sentiment threshold 350. Based on timeseries 326, the system can determine whether sentiment crosses sentiment threshold 350 for more than the threshold time 336 (e.g., for time unsatisfied 334). Based on the determination, the system can determine or detect the presence of negative anomaly 330 and take any preventative measures accordingly. In some embodiments, sentiment threshold 350 is expressed as a number within a numerical range of sentiments. For example, criteria can specify a conditional statement with respect to the sentiment threshold 350. As an illustrative example, a criterion can specify that sentiment score 322 must fall below sentiment threshold 350 for classification as an anomaly. In some embodiments, the criterion can specify that sentiment score 322 must rise above sentiment threshold 350 for classification as an anomaly. By enabling monitoring of sentiment and comparison with respect to a set threshold value, the system enables objective comparisons between interactions and fair, consistent treatment of sentiment during interactions. By doing so, the system enables direct comparison of anomaly detection events between interactions or associated operators, which facilitates evaluation and training of operators across the network. Furthermore, the system can detect where sentiment has deviated for a significant amount of time (rather than, for example, a transient amount of time, due to noise in sentiment analysis algorithms), enabling robustness and reliability in anomaly detection.

For example, the system can obtain criteria that include threshold time 340 and threshold sentiment change 342. Based on timeseries 326, the system can determine whether sentiment has changed more than threshold sentiment change 342. For example, the system can determine whether sentiment has deviated from a reference datapoint (e.g., reference datapoint 344) by more than the threshold sentiment change 342 for greater than threshold time 340. As an illustrative example, the system can determine change in sentiment 338 as a difference in sentiment score 322 between reference datapoint 344 and a monitored datapoint 346. Note that choices for reference datapoint 344 and monitored datapoint 346 can be modified over time in response to detection of a change in sentiment. Based on determining that change in sentiment 338 is greater than threshold sentiment change 342 and for time of change 348 that is longer than threshold time 340, the system can determine the likely presence of an anomaly and respond accordingly. In some instances, time of change 348 is measured as between reference datapoint 344 and monitored datapoint 346. In some cases, time of change 348 is measured from when timeseries 326 exceeds threshold sentiment change 342 with respect to reference datapoint 344. By including criteria relating to a change in sentiment, the system monitors both negative and positive anomalies, thereby enabling holistic evaluation of the timeseries and any unexpected sentiment-related behavior within the interaction. For example, the system can determine that a user is happy or satisfied and, in response, notify an operator to generate a recommendation for the user for further services or features. Alternatively or additionally, the system can determine whether to notify operators or controllers based on detecting a negative anomaly. The system can generate notifications or messages that include indications of time unsatisfied 334, time of change 348, or change in sentiment 338, to provide contextual information to characterize any detected anomalies.

Criteria indicating the presence of anomalies within an interaction can include one or more keywords. Keywords can include words determined to be associated with sentiments. For example, keywords can be associated with positive sentiment, such as the following words or phrases: "happy," "great," "brilliant," or "thanks for the help." Keywords can be associated with negative sentiment, such as the following words or phrases: "sad," "disappointed," "disgusting," or "I hate you." Keywords can be stored in a keyword database, or any other data structure. The system can compare words associated with interactions (e.g., words within a textual representation of a video chat between a user and an operator) with words within a keyword database and determine, for example, a frequency of such words, as well as a characterization of such words. As an illustrative example, the system can determine that, because a large proportion of words within the interaction are associated with anger-related keywords, the interaction is likely to have become anomalous and, therefore, the system can flag the interaction as being associated with a negative anomaly. In some embodiments, the system can generate a report based on such keywords, to justify or characterize the presence of anomalies, rendering evaluation of interactions more effective and evidence based.

In response to determining the presence of one or more anomalies within an interaction, the system can generate a notification indicating that the operator needs assistance. In disclosed embodiments, a notification can include a message, alert, signal, or another indication. For example, the system can generate a message indicating a problem associated with a call (e.g., the presence of a negative anomaly). In some embodiments, the notification can include further information characterizing the interaction, such as an interaction identifier or an identifier of the respective operator, user, and/or keywords flagged as anomalous. As an illustrative example, the system can generate this notification and transmit it to other operators (e.g., assisting operators) and/or controllers (e.g., managers of operators) to alert them of any anomalies and enable preventative, responsive, or mitigative action with respect to the interaction. For instance, the system can receive information regarding the availability of one or more assisting operators and enable those operators that are determined to be available to communicate within the interaction in question to respond to any determined anomalies. By doing so, the system can improve the effectiveness of the telecommunication network's communications with users dynamically, before the user disengages with the network or performs any other adverse actions.

The system can generate dynamic or organization-level reports and transmit these reports to relevant stakeholders. A report can include any description, summary, analysis, or characterization of an interaction. For example, a report can include indications of average sentiments of timeseries associated with interactions, corresponding indications of anomalies, and any relevant keywords indicating anomalies. For example, such a report can be transmitted to operators or stakeholders associated with the interaction's operator to provide information to assist in training the operator.

Figure 4:
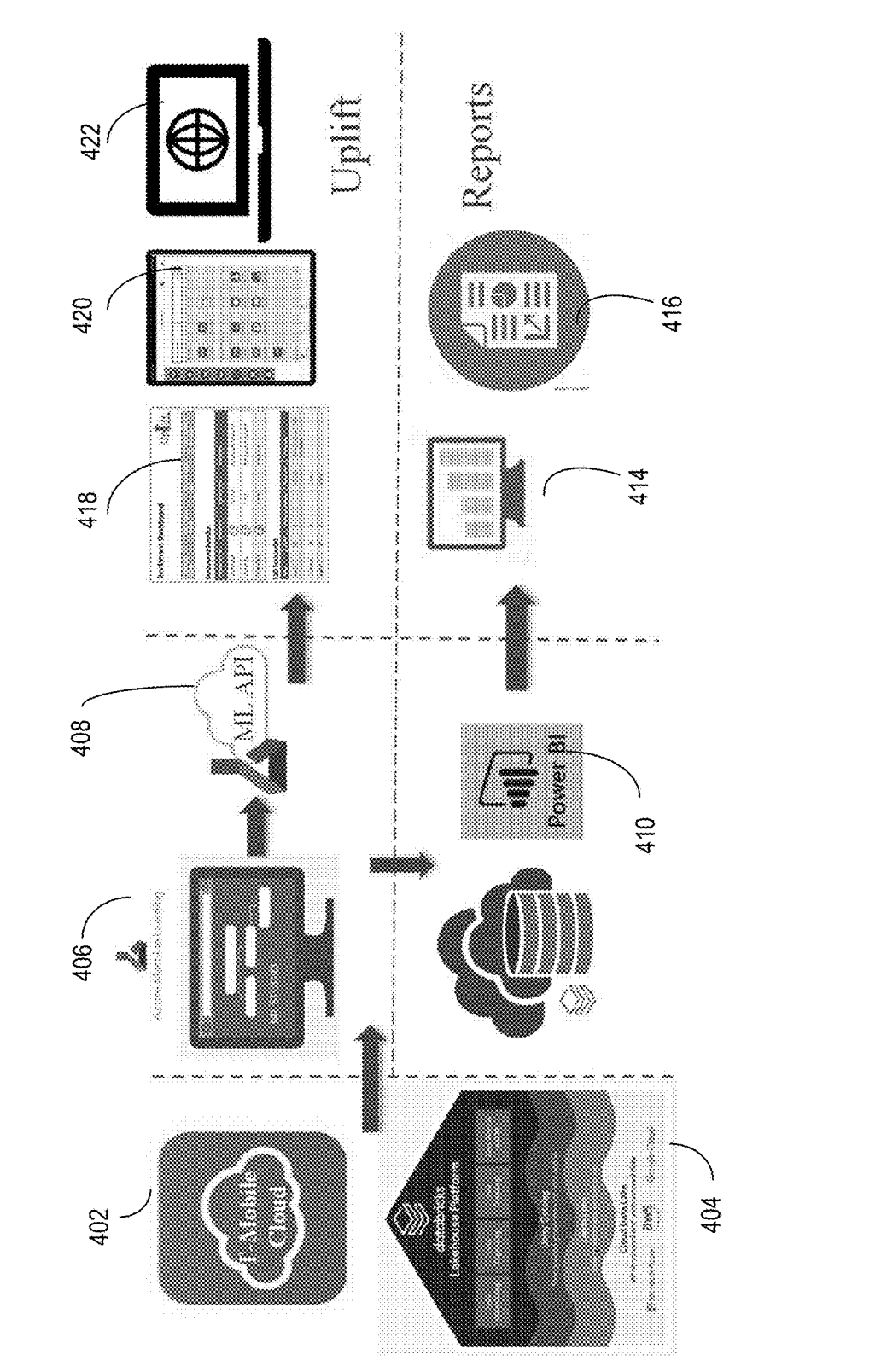
FIG. 4 is a schematic of a workflow for generating dynamic or cumulative sentiment tracking reports.

FIG. 4 is a schematic of a workflow for generating dynamic or cumulative sentiment tracking reports. For example, flow 400 depicts a method for generating dynamic reports 418-422 (e.g., "Uplift") for evaluation by operators and controllers, as well as the generation of organization-level reports 414 and/or 416.

For example, the system can store information relating to interactions within cloud storage 402 and/or 404. For example, cloud storage 402-404 includes transcripts of audio or video interactions between users and operators of wireless telecommunication networks. Other representations of interactions, such as audio files, video files, text messages, chats, text strings, or characters can be stored on cloud storage 402-404. For example, the system can retrieve such indications of interactions from cloud storage 402 utilizing network connections 114, as depicted in FIG. 1.

Based on interactions stored within cloud storage, the system can utilize machine learning tools 406 through application programming interfaces 408 in order to process interactions and determine sentiment, such as timeseries of sentiment. For example, the system utilizes NLP models through Azure Machine Learning to determine a user's sentiment throughout an interaction retrieved from cloud storage 402.

The system can utilize analytics tools 410, such as Power BI, in order to generate organization-level reports 414 or 416. For example, the system can compile sentiment information across various interactions, various users, and/or various operators and generate reports related to these interactions. In some embodiments, the system can generate rankings of operators based on user sentiment associated with such operators over the course of corresponding interactions. By generating compiled (e.g., organization-level) reports, the system improves the completeness of interaction-related information and enables correlation of user sentiment with operator behavior. More widely, generating such broad reports can enable analysis of user engagement with wireless telecommunications networks as correlated with user interactions, such as user churn or disengagement as a result of interactions associated with negative sentiment.

Figure 5:
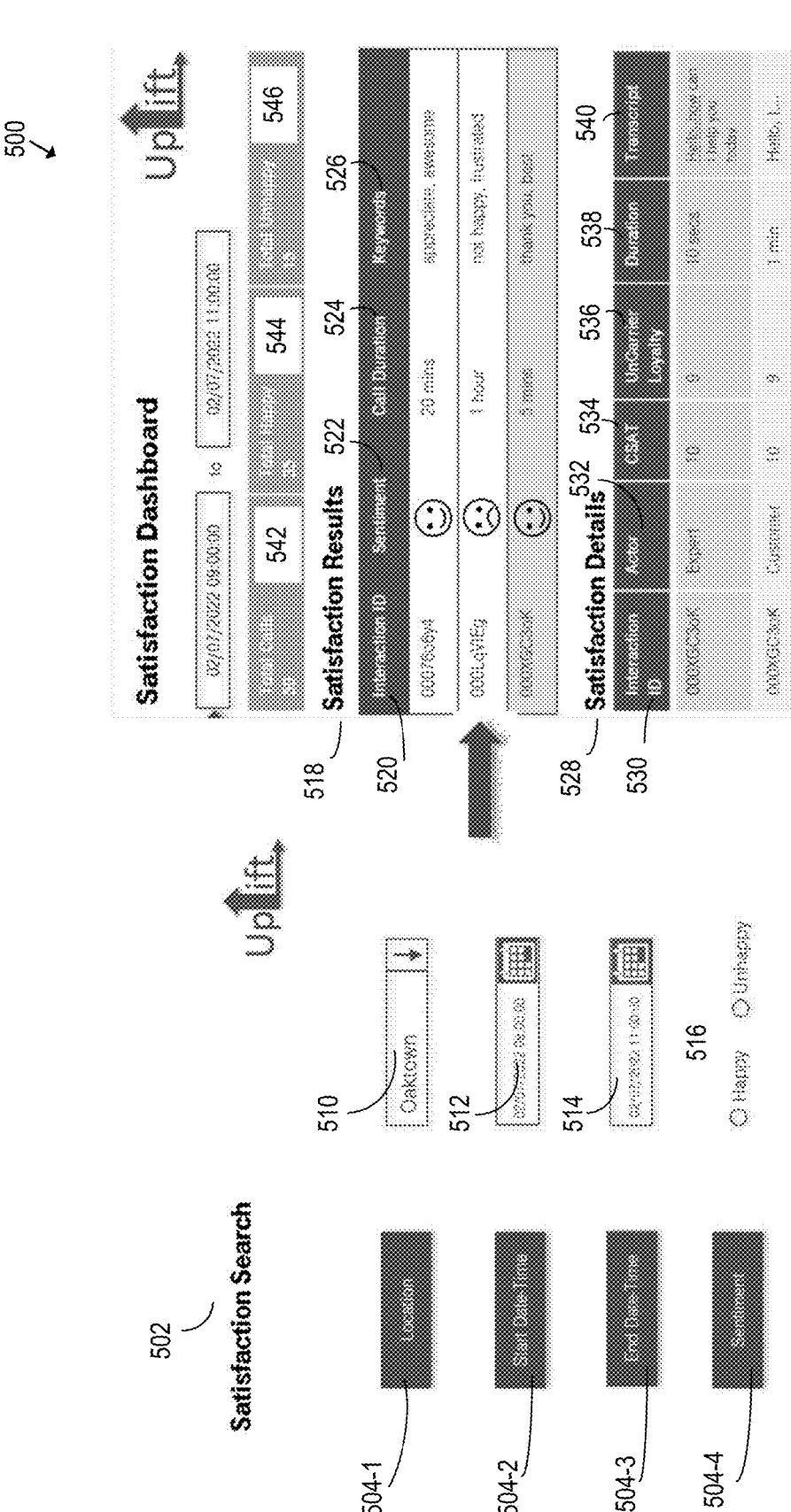
FIG. 5 is a schematic of a user interface for summarizing, monitoring, and analyzing sentiment analysis results as a function of time, interaction, or keyword.

FIG. 5 depicts a schematic of a user interface for summarizing, monitoring and analyzing sentiment analysis results as a function of time, interaction, or keyword. Additionally or alternatively, the system can monitor sentiment in real time. For example, through "Uplift," the system can generate analytics based on sentiment associated with interactions. Such analytics can be generated as dynamic reports 418-422, as shown in FIG. 4 and/or user interface 500. For example, user interface 500 includes satisfaction search 502, enabling real-time monitoring of interactions through searching by location 504-1, start date/time 504-2, end date/time 504-3, and/or sentiment 504-4, for example through fields 510, 512, 514 and/or 516 respectively.

In some embodiments, the system can generate a satisfaction dashboard, including satisfaction results 518 and satisfaction details 528. As an example, the system can characterize interactions, identified by interaction identifiers 520, sentiment 522, call duration 524, and/or keywords 526. Interactions can also be associated with satisfaction details 528, including further details regarding sentiment during interactions (as sorted by interaction identifiers 530), such as by identifying speakers associated with particular statements, anomalies or keywords (e.g., actors 532), satisfaction scores 534, loyalty metrics 536, duration 538, and/or corresponding transcript 540. In some embodiments, the system can summarize metrics across multiple interactions, such as through total calls field 542, total happy sentiment field 544, and/or total unhappy sentiment field 546. By generating such reports dynamically during and immediately following interactions, the system enables monitoring for anomalies within transcripts, such as identification of keywords 526 associated with anomalous sentiment. By doing so, the system may dynamically react to sentiment during interactions to improve user satisfaction with the interaction.

As an illustrative example, the system can determine a ranking of operators associated with the wireless telecommunications network. For example, the system can generate an average sentiment associated with timeseries corresponding to a given operator and compare these average sentiments amongst multiple operators. By comparing each of these average sentiments with each other, the system can generate a ranking of operators within the telecommunications network. By doing so, the system can provide analysis and/or evaluation of operator performance. For example, the system can determine a subset of operators to be marked for training based on a threshold ranking. Using reports generated by the system, the system can generate personalized reports for controllers to train operators based on sentiment associated with interactions led by operators marked for training. By doing so, the system enables improvements to operator effectiveness. By generating such reports dynamically, the system can enable faster feedback to operators, enabling any problems to be solved sooner than in conventional systems.

In some embodiments, the system can utilize sentiment data relating to interactions to predict network-level information. For example, the system can determine network satisfaction metrics, which can include indications of average sentiment across multiple interactions. For example, a network satisfaction metric can include an average sentiment across all interactions characterized by users of 5G services associated with a telecommunications network provider. In some embodiments, the system can generate a predicted attrition rate, which relates to a probability or a proportion of users that are predicted to disengage with the telecommunication network. By generating such organization-level metrics, the system improves the quality of problem solving and user analytics based on relevant interaction data.

Figure 6:
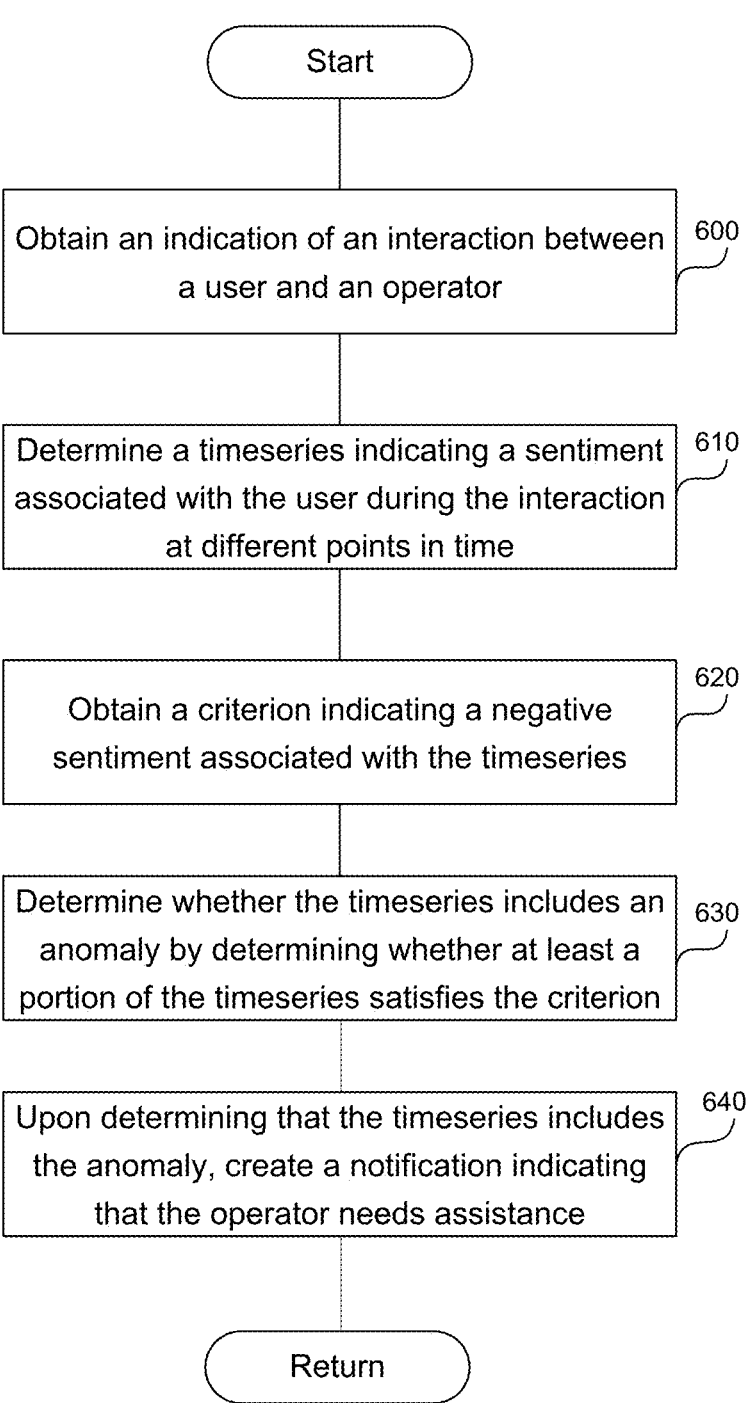
FIG. 6 is a flowchart demonstrating a process for monitoring user sentiment during an interaction, generating a timeseries, and detecting or responding to anomalies.

FIG. 6 is a flowchart demonstrating a process for monitoring user sentiment during an interaction, generating a timeseries and detecting or responding to anomalies. By monitoring anomalies and responding to such anomalies, the system enables dynamic intervention and response to unexpected actions, emotions, and/or behavior within interactions, thereby improving the quality of user satisfaction.

At operation 600, the system can obtain an indication of an interaction between a user and an operator. For example, the system can obtain an indication of an interaction between a user of a wireless telecommunication network and an operator of the wireless telecommunication network. In some embodiments, the system can obtain a textual representation of an interaction, such as a video call, between a user and an operator of a network. For example, the system can generate a textual transcript of an interaction, based on processing an audio file of the video call using a speech-to-text algorithm. In some embodiments, the system provides the indication of the interaction (e.g., a textual representation of the interaction) to an artificial intelligence configured to analyze natural language. By doing so, the system enables utilization of NLP techniques for sentiment determination, thereby streamlining evaluation of the sentiment associated with the interaction. Thus, the system can obtain information related to the interaction for real-time sentiment analysis, thereby enabling dynamic decision-making based on anomaly detection of relevant interactions.

At operation 610, the system can determine a timeseries indicating a sentiment associated with the user during the interaction at different points in time. For example, the sentiment can represent a satisfied sentiment and an unsatisfied sentiment using a numerical range. In disclosed embodiments, the system separates the indication of the interaction into multiple portions wherein a portion among the multiple portions occurs within a continuous time period. The system can determine the sentiment associated with a portion among the multiple portions. The system can create the timeseries correlating the continuous time period and the sentiment. For example, the system can generate timeseries 326, as depicted in FIG. 3B, based on data points, where each data point is associated with a portion of the interaction (e.g., a phrase, time period, or sentence associated with the interaction). By generating such a timeseries, the system enables evaluation of unexpected behavior in sentiment analysis, such as spikes, dips, or other anomalies in sentiment.

At operation 620, the system can obtain a criterion indicating a negative sentiment associated with the timeseries. For example, the system can retrieve information suitable for determining the presence of anomalies within the timeseries. Such criteria can include information characterizing deviations from an average sentiment value or thresholds indicating amounts of time or a value for sentiment. By obtaining such criteria, such as from a database of such criteria, the system can retrieve rules for flagging or evaluating timeseries of sentiment during interactions, thereby enabling the system to respond to unexpected sentiment or behavior accordingly.

At operation 630, the system can determine whether the timeseries includes an anomaly by determining whether at least a portion of the timeseries satisfies the criterion. For example, the system can compare the timeseries with any obtained criteria in order to determine the presence of any anomalies and determine their nature (e.g., whether they are positive, neutral, or negative, and to what extent). For example, the system can detect a sudden, large drop in the sentiment, potentially indicating a frustrated or angry user. By monitoring for such events, the system enables system administrators, controllers, and/or operators to take actions to mitigate the effects of such shifts in sentiment. By doing so, the system can prevent further undesirable, or adverse actions, by users, thereby improving overall interaction outcomes and improving user satisfaction.

In some embodiments, the system can obtain criteria relating to whether the timeseries indicates a negative sentiment over a large enough amount of time to be marked as an anomaly. For example, the system can obtain the criterion including obtaining a first threshold indicating an amount of time and a second threshold indicating a number within the numerical range. The system can determine whether the timeseries includes a period of time equal to or greater than the first threshold during which the sentiment and the second threshold indicate that the user is unsatisfied. Upon determining that the timeseries includes the period of time equal to or greater than the first threshold during which the sentiment and the second threshold indicate that the user is unsatisfied, the system can determine that the timeseries includes the anomaly. For example, the system can determine whether a timeseries associated with an interaction indicates that a user is unsatisfied (e.g., that sentiment is beyond a threshold associated with dissatisfaction) for enough time. By specifying a threshold time value (e.g., the first threshold), the system ensures that volatile or transient fluctuations in sentiment are discounted, as these can be due to model error or insignificant variations in sentiment. Thus, the system can capture situations where sentiment is unsatisfactory for extended periods of time, thereby improving the chance of detecting situations where preemptive intervention may assist the user and improve sentiment.

In some embodiments, the system can obtain criteria relating to whether the timeseries indicates a negative sentiment based on keywords associated with the interaction. For example, the system can obtain the criterion that can include multiple keywords indicating that the user is unsatisfied. The system can determine whether the indication of the interaction includes a keyword among the multiple keywords. Upon determining that the indication of the interaction includes the keyword among the multiple keywords, the system can determine that the timeseries includes the anomaly. For example, the system can determine, based on comparing words extracted from the indication of the interaction with keywords within a keyword database, the presence and nature of any keywords associated with the interaction. For example, the system can determine whether keywords from the keyword database are present, as well as the sentiment indicated by such keywords. By doing so, the system can evaluate the sentiment associated with portions of the interaction based on such keywords and provide these keywords to stakeholders through reports and/or notifications. Thus, by identifying keywords, the system can evaluate sentiment associated with the interaction and, additionally or alternatively, provide evidence for such determined sentiments.

In some embodiments, the system can obtain criteria relating to whether the timeseries indicates a change in sentiment that lasts at least a particular amount of time. For example, the system can obtain the criterion including a first threshold indicating a change in the sentiment and an amount of time. The system can determine whether the timeseries includes the first threshold wherein the change in the sentiment lasts at least the amount of time. Upon determining that the timeseries includes the first threshold wherein the change in the sentiment lasts at least the amount of time, the system can determine that the timeseries includes the anomaly. For example, the system can determine whether the timeseries indicates that sentiment has changed from a baseline or another measure over a long enough elapsed time. Thus, the system can capture changes in sentiment that are negative or positive, enabling action to be taken for both undesirable and desirable situations. By doing so, the system enables robustness and flexibility in monitoring sentiment over time during an interaction, by potentially generating for stakeholders, such as other operators or controllers, both positive and negative feedback to provide operators for training purposes, for example.

At operation 640, upon determining that the timeseries includes the anomaly, the system can create a notification indicating that the wireless telecommunication operator needs assistance. For example, the system can transmit messages or alerts to operators or controllers based on determined anomalies. As an illustrative example, the system can transmit information regarding the nature of anomalies (e.g., a sentiment metric, or a length of time for which the anomaly endured) to controllers for monitoring or training of operators. For example, the system can enable actions to be taken to mitigate anomalies (e.g., by including other operators in the interaction in order to improve user sentiment). By doing so, the system enables real-time monitoring and reacting to sentiment within communications between users and operators of wireless telecommunication networks.

In some embodiments, the system can rank operators based on average sentiments associated with timeseries of operators. For example, the system can determine an average sentiment of the timeseries, wherein the average sentiment of the timeseries represents an arithmetic mean of sentiments associated with the multiple portions of the indication of the interaction. The system can compare the overage sentiment of the timeseries with a plurality of average sentiments associated with a plurality of operators of the wireless telecommunication network. Based on comparing the average sentiment of the timeseries with each average sentiment of the plurality of average sentiments, the system can generate a ranking of the operator with respect to the plurality of operators. For example, the system can generate metrics to evaluate whether operators are associated with more positive or negative sentiment. Based on these metrics, the system can determine rankings of operators. For example, the system can generate a subset of operators that can benefit from training based on a threshold ranking and generate associated sentiment reports to facilitate such training. By doing so, the system enables monitoring and evaluation of operators in real-time, facilitating provision of immediate training and feedback to operators.

In some embodiments, the system can generate a report to facilitate training of operators. For example, based on determining that the timeseries includes the anomaly, the system can generate a report for the interaction using the timeseries, wherein the report comprises one or more of an indication of an average sentiment of the timeseries, an indication of the anomaly, and one or more keywords included in the indication of the interaction indicating that the user is unsatisfied. Based on an identifier of the operator, the system can determine an associated controller. The system can transmit the report to the associated controller to enable the associated controller to train the operator. For example, where an anomaly is detected within an interaction, the system can generate a report related to this anomaly and transmit it to a manager, supervisor, or controller of the operator, such that the operator may subsequently train the operator during or following the interaction. By doing so, the system enables immediate provision of feedback to operators, as facilitated through controllers or managers.

In some embodiments, the system can enable other operators that are capable of assisting the operator to communicate in the interaction. For example, based on determining that the timeseries includes the anomaly, the system can determine a plurality of assisting operators associated with the operator. The system can transmit the notification indicating that the wireless telecommunication operator needs assistance to the plurality of assisting operators. Based on receiving, from one or more assisting operators of the plurality of assisting operators, one or more responses indicating availability, the system can configure communication links between the one or more assisting operators and the user to enable assistance of the user. For example, the system, upon detecting an anomaly, can query operators as to whether they are available to assist the operator in question. Based on receiving information relating to the operators' availability, the system enables such operators to be communicably linked to the original interaction, thereby enabling their assistance or intervention. By doing so, the system enables improved, real-time, dynamic response to anomalous interactions based on monitoring of user sentiment to prevent adverse consequences due to unsatisfactory user sentiment.

In some embodiments, the system can generate network-related metrics relating to sentiments in interactions. For example, the system can determine a plurality of timeseries corresponding to a plurality of interactions between users of the wireless telecommunication network and operators of the wireless telecommunication network, wherein timeseries of the plurality of timeseries represent sentiments associated with users during corresponding interactions at different points in time. The system can determine a plurality of average sentiments corresponding to the plurality of time-series. Based on the plurality of average sentiments, the system can determine a network satisfaction metric and a predicted attrition rate, wherein the network satisfaction metric indicates an average sentiment across the plurality of interactions and wherein the predicted attrition rate indicates a predicted percentage of the users that will disengage with the wireless telecommunication network. For example, the system can generate metrics relating to general satisfaction over time across larger portions of the network and correlate such metrics with attrition rates, in order to determine the likelihood of user churn or user disengagement based on satisfaction in interactions. By doing so, the system enables organization-level evaluation of user satisfaction, enabling decisions based on large-scale analytics, rather than decisions only based on individual interaction-level analytics.

Computer System

Figure 7:
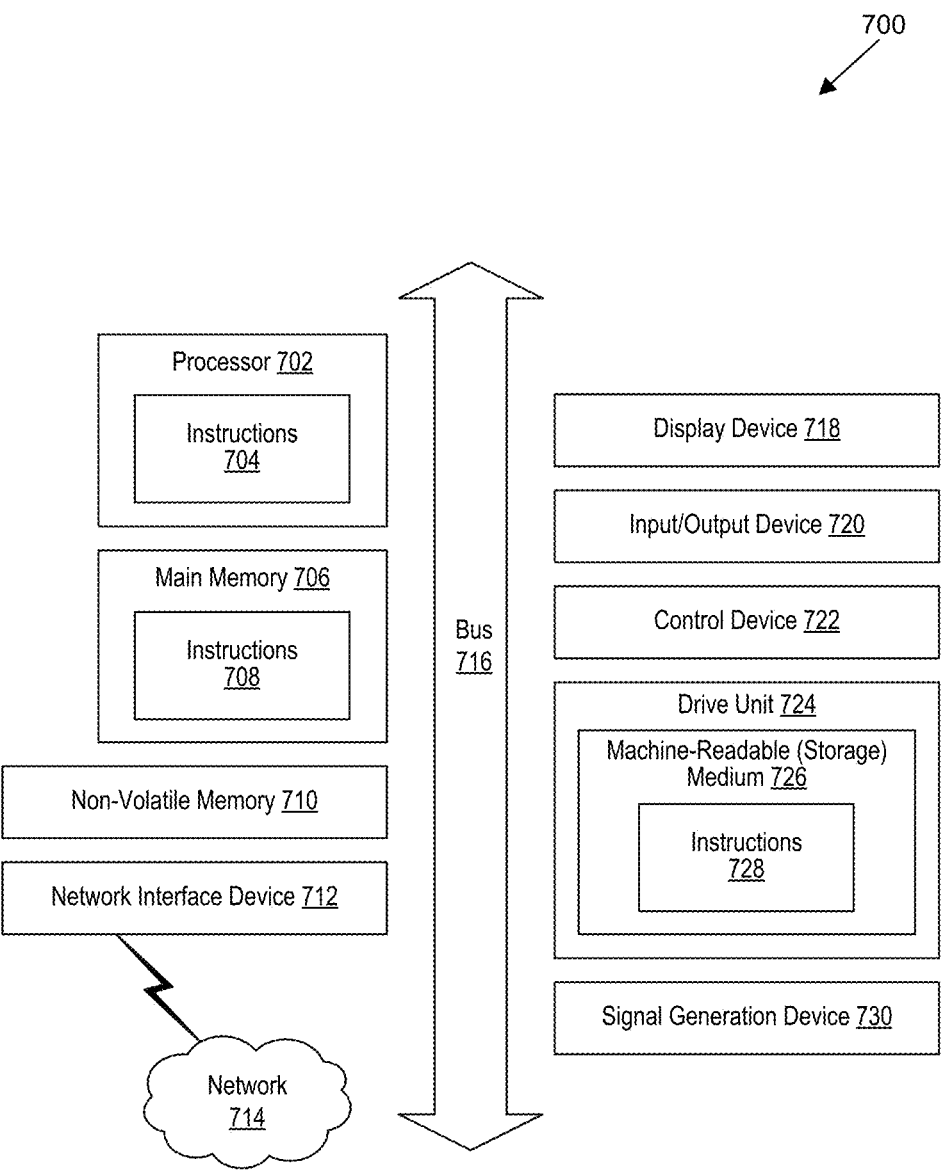
FIG. 7 is a block diagram that illustrates components of a computing device in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, video display device 718, an input/output device 720, a control device 722 (e.g., keyboard and pointing device), a drive unit 724 that includes a storage medium 726, and a signal generation device 730, which are all communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementation, the computer system 700 can be an embedded computer system, a system-on-chip (SOC), a single-board computer system (SBC) or a distributed system such as a mesh of computer systems or include one or more cloud components in one or more networks. Where appropriate, one or more computer systems 700 can perform operations in real time, near real time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adapter card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

REMARKS

The terms "example", "embodiment," and "implementation" are used interchangeably. For example, reference to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. At least one non-transitory, computer-readable storage medium storing instructions, which, when executed by at least one data processor of a system, cause the system to:

obtain a textual representation of an interaction between a user of a wireless telecommunication network and an operator of the wireless telecommunication network;

obtain a criterion comprising multiple keywords indicating positive user sentiment;

input the textual representation of the interaction and the obtained criterion to an artificial intelligence model configured to analyze natural language to determine, by the artificial intelligence model, a timeseries indicating a set of user sentiment values during the interaction at different points in time, wherein each user sentiment value of the set of user sentiment values represents a satisfied sentiment or an unsatisfied sentiment using a numerical range, and wherein determining the timeseries includes:

separating the textual representation into multiple portions wherein a particular portion among the multiple portions occurs within a continuous time period;

determining a proportion value characterizing a proportion of words of the textual representation that are associated with the multiple keywords indicating the positive user sentiment;

determining, using the proportion value and by the artificial intelligence model, a particular user sentiment value associated with the particular portion among the multiple portions; and creating the timeseries correlating the continuous time period and the set of user sentiment values;

determine whether the timeseries includes an anomaly by determining whether at least a portion of the timeseries satisfies the criterion; and upon determining that the timeseries includes the anomaly, transmit a notification indicating that the operator of the wireless telecommunication network generate a recommendation;

determine one or more available assisting operators comprising at least one machine learning model associated with at least one controller;

in response to determining the one or more available assisting operators, determine, using an access and mobility management function (AMF) component of the wireless telecommunication network and by querying a network function repository function (NRF), an indication of one or more communication links associated with the one or more available assisting operators;

in response to determining the indication of the one or more communication links, dynamically configuring, using a session management function (SMF) component, the one or more communication links between the one or more available assisting operators and the user to enable assistance of the user, wherein the one or more available assisting operators include the at least one machine learning model;

based on determining that the timeseries includes the anomaly, generate a report for the interaction using the timeseries;

based on an identifier of the operator, determine the at least one controller including a training algorithm; and transmit the report to the determined at least one controller to enable training of the one or more available assisting operators using the training algorithm of the at least one controller.

2. The at least one non-transitory, computer-readable medium of claim 1, including instructions to:

obtain the criterion including obtaining a first threshold indicating an amount of time and a second threshold indicating a number within the numerical range;

determine whether the timeseries includes a period of time equal to or greater than the first threshold during which the set of user sentiment values and the second threshold indicate that the user is unsatisfied; and upon determining that the timeseries includes the period of time equal to or greater than the first threshold during which the set of user sentiment values and the second threshold indicate that the user is unsatisfied, determine that the timeseries includes the anomaly.

3. The at least one non-transitory, computer-readable medium of claim 1, including instructions to:

obtain the criterion including a set of keywords indicating that the user is unsatisfied;

determine whether the textual representation of the interaction includes a keyword among the set of keywords; and upon determining that the textual representation of the interaction includes the keyword among the set of keywords, determine that the timeseries includes the anomaly.

4. The at least one non-transitory, computer-readable medium of claim 1, including instructions to:

obtain the criterion including a first threshold indicating a change in the user sentiment values, and an amount of time;

determine whether the timeseries includes the first threshold wherein the change in the user sentiment values lasts at least the amount of time; and upon determining that the timeseries includes the first threshold wherein the change in the user sentiment values lasts at least the amount of time, determine that the timeseries includes the anomaly.

5. The at least one non-transitory, computer-readable medium of claim 1, including instructions to:

determine an average sentiment of the timeseries, wherein the average sentiment of the timeseries represents an arithmetic mean of sentiments associated with the multiple portions of the textual representation of the interaction;

compare the average sentiment of the timeseries with a plurality of average sentiments associated with a plurality of operators of the wireless telecommunication network; and based on comparing the average sentiment of the timeseries with each average sentiment of the plurality of average sentiments, generate a ranking of the operator with respect to the plurality of operators.

6. The at least one non-transitory, computer-readable medium of claim 1, including instructions to:

based on the determining that the timeseries includes the anomaly, generate a report for the interaction using the timeseries, wherein the report comprises one or more of:
an indication of an average sentiment of the timeseries,
an indication of the anomaly, and

28 one or more keywords included in the textual representation indicating that the user is unsatisfied;

based on an identifier of the operator, determine an associated controller; and transmit the report to the associated controller to enable the associated controller to train the operator.

7. The at least one non-transitory, computer-readable medium of claim 1, including instructions to:

based on determining that the timeseries includes the anomaly, determine a plurality of assisting operators associated with the operator;

transmit the notification indicating that the operator needs assistance to the plurality of assisting operators; and based on receiving, from one or more assisting operators of the plurality of assisting operators, one or more responses indicating availability, configure communication links between the one or more assisting operators and the user to enable assistance of the user.

8. The at least one non-transitory, computer-readable medium of claim 1, including instructions to:

determine a plurality of timeseries corresponding to a plurality of interactions between users of the wireless telecommunication network and operators of the wireless telecommunication network, wherein timeseries of the plurality of timeseries represent sentiments associated with users during corresponding interactions at different points in time;

determine a plurality of average sentiments corresponding to the plurality of timeseries; and based on the plurality of average sentiments, determine a network satisfaction metric and a predicted attrition rate, wherein the network satisfaction metric indicates an average sentiment across the plurality of interactions, and wherein the predicted attrition rate indicates a predicted percentage of the users that will disengage with the wireless telecommunication network.

9. A system comprising:

at least one hardware processor; and at least one non-transitory memory storing instructions, which, when executed by the at least one hardware processor, cause the system to:

obtain an indication of an interaction between a user of a wireless telecommunication network and an operator of the wireless telecommunication network;

obtain a criterion comprising multiple keywords indicating positive user sentiment;

determine a timeseries indicating a set of user sentiment values associated with the user during the interaction at different points in time, wherein each user sentiment value of the set of user sentiment values represents a satisfied sentiment or an unsatisfied sentiment using a numerical range, and wherein determining the timeseries includes:

separating the indication of the interaction into multiple portions wherein a particular portion among the multiple portions occurs within a continuous time period;

determining a proportion value characterizing a proportion of words of the indication of the interaction that are associated with the multiple keywords indicating the positive user sentiment;

determining, using the proportion value, a particular user sentiment value associated with the particular portion among the multiple portions; and creating the timeseries correlating the continuous time period and the set of user sentiment values;

determine whether the timeseries includes an anomaly by
determining whether at least a portion of the timeseries
satisfies the criterion;
upon determining that the timeseries includes the
anomaly, create a notification indicating that the operator of the wireless telecommunication network generate
a recommendation;
determine one or more available assisting operators com-
prising at least one machine learning model associated
with at least one controller;
in response to determining the one or more available
assisting operators, determine, using an AMF compo-
nent of the wireless telecommunication network and by
querying an NRF, an indication of one or more com-
munication links associated with the one or more
available assisting operators;
in response to determining the indication of the one or
more communication links, dynamically configuring,
using an SMF component, the one or more communi-
cation links between the one or more available assisting
operators and the user to enable assistance of the user,
wherein the one or more available assisting operators
include the at least one machine learning model;
based on determining that the timeseries includes the
anomaly, generate a report for the interaction using the
timeseries;
based on an identifier of the operator, determine the at
least one controller including a training algorithm; and
transmit the report to the determined at least one control-
ler to enable training of the one or more available
assisting operators using the training algorithm of the at
least one controller.
10. The system of claim 9, wherein instructions cause the
system to:
obtain the criterion including obtaining a first threshold
indicating an amount of time and a second threshold
indicating a number within the numerical range;
determine whether the timeseries includes a period of
time equal to or greater than the first threshold during
which the set of user sentiment values and the second
threshold indicate that the user is unsatisfied; and
upon determining that the timeseries includes the period
of time equal to or greater than the first threshold during
which the set of user sentiment values and the second
threshold indicate that the user is unsatisfied, determine
that the timeseries includes the anomaly.
11. The system of claim 9, wherein the instructions cause
the system to:
obtain the criterion including a set of keywords indicating
that the user is unsatisfied;
determine whether the indication of the interaction
includes a keyword among the set of keywords; and
upon determining that the indication of the interaction
includes the keyword among the set of keywords,
determine that the timeseries includes the anomaly.
12. The system of claim 9, wherein the instructions cause
the system to:
obtain the criterion including a first threshold indicating a
change in the user sentiment values, and an amount of
time;
determine whether the timeseries includes the first thresh-
old wherein the change in the user sentiment values
lasts at least the amount of time; and
upon determining that the timeseries includes the first
threshold wherein the change in the user sentiment
values lasts at least the amount of time, determine that
the timeseries includes the anomaly.

13. The system of claim 9, wherein the instructions cause
the system to:
determine an average sentiment of the timeseries,
wherein the average sentiment of the timeseries repre-
sents an arithmetic mean of sentiments associated
with the multiple portions of the indication of the
interaction;
compare the average sentiment of the timeseries with a
plurality of average sentiments associated with a plu-
rality of operators of the wireless telecommunication
network; and
based on comparing the average sentiment of the time-
series with each average sentiment of the plurality of
average sentiments, generating a ranking of the opera-
tor with respect to the plurality of operators.
14. The system of claim 9, wherein the instructions cause
the system to:
based on determining that the timeseries includes the
anomaly, generate a report for the interaction using the
timeseries,
wherein the report comprises one or more of:
an indication of an average sentiment of the timeseries,
an indication of the anomaly, and
one or more keywords included in the indication of the
interaction indicating that the user is unsatisfied;
based on an identifier of the operator, determine an
associated controller; and
transmit the report to the associated controller to enable
the associated controller to train the operator.
15. The system of claim 9, wherein the instructions cause
the system to:
based on determining that the timeseries includes the
anomaly, determine a plurality of assisting operators
associated with the operator;
transmit the notification indicating that the operator of the
wireless telecommunication network needs assistance
to the plurality of assisting operators; and
based on receiving, from one or more assisting operators
of the plurality of assisting operators, one or more
responses indicating availability, configure communi-
cation links between the one or more assisting opera-
tors and the user to enable assistance of the user.
16. The system of claim 9, wherein the instructions cause
the system to:
determine a plurality of timeseries corresponding to a
plurality of interactions between users of the wireless
telecommunication network and operators of the wire-
less telecommunication network,
wherein timeseries of the plurality of timeseries repre-
sent sentiments associated with users during corre-
sponding interactions at different points in time;
determine a plurality of average sentiments corresponding
to the plurality of timeseries; and
based on the plurality of average sentiments, determine a
network satisfaction metric and a predicted attrition
rate,
wherein the network satisfaction metric indicates an
average sentiment across the plurality of interac-
tions, and
wherein the predicted attrition rate indicates a predicted
percentage of the users that will disengage with the
wireless telecommunication network.
17. A method comprising:
obtaining an indication of an interaction between a user of
a wireless telecommunication network and an operator
of the wireless telecommunication network;

obtain a criterion comprising multiple keywords indicating positive user sentiment;

determining a timeseries indicating a set of user sentiment values associated with the user during the interaction at different points in time, wherein the user sentiment value of the set of user sentiment values represents a satisfied sentiment or an unsatisfied sentiment using a numerical range, and wherein determining the timeseries includes:

separating the indication of the interaction into multiple portions wherein a portion among the multiple portions occurs within a continuous time period;

determining a proportion value characterizing a proportion of words of the indication of the interaction that are associated with the multiple keywords indicating the positive user sentiment;

determining, using the proportion value, a particular user sentiment value associated with the particular portion among the multiple portions; and creating the timeseries correlating the continuous time period and the set of user sentiment values;

determining whether the timeseries includes an anomaly by determining whether at least a portion of the timeseries satisfies the criterion;

upon determining that the timeseries includes the anomaly, creating a notification indicating that the operator of the wireless telecommunication network generate a recommendation;

determining one or more available assisting operators comprising at least one machine learning model associated with at least one controller;

in response to determining the one or more available assisting operators, determine, using an AMF component of the wireless telecommunication network and by querying an NRF, an indication of one or more communication links between the one or more available assisting operators and the user to enable assistance of the user, wherein the one or more available assisting operators include the at least one machine learning model;

based on determining that the timeseries includes the anomaly, generate a report for the interaction using the timeseries;

based on an identifier of the operator, determine the at least one controller including a training algorithm; and transmit the report to the determined at least one controller to enable training of the one or more available assisting operators using the training algorithm of the at least one controller.

18. The method of claim 17, comprising:

obtaining the criterion including obtaining a first threshold indicating an amount of time and a second threshold indicating a number within the numerical range;

determining whether the timeseries includes a period of time equal to or greater than the first threshold during which the set of user sentiment values and the second threshold indicate that the user is unsatisfied; and upon determining that the timeseries includes the period of time equal to or greater than the first threshold during which the set of user sentiment values and the second threshold indicate that the user is unsatisfied, determining that the timeseries includes the anomaly.

19. The method of claim 17, comprising:

obtaining the criterion including a set of keywords indicating that the user is unsatisfied;

determining whether the indication of the interaction includes a keyword among the set of keywords; and upon determining that the indication of the interaction includes the keyword among the set of keywords, determining that the timeseries includes the anomaly.

20. The method of claim 17, comprising:

obtaining the criterion including a first threshold indicating a change in the user sentiment values, and an amount of time;

determining whether the timeseries includes the first threshold wherein the change in the user sentiment values lasts at least the amount of time; and upon determining that the timeseries includes the first threshold wherein the change in the user sentiment values lasts at least the amount of time, determining that the timeseries includes the anomaly.

* * * * *